Dec. 15, 1931. P. J. KELLY 1,836,374
VALVE
Filed Dec. 23, 1927 4 Sheets-Sheet 3
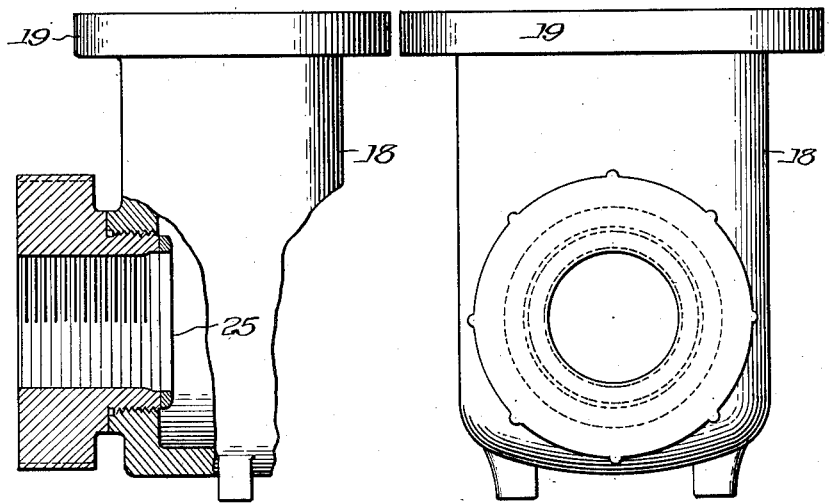

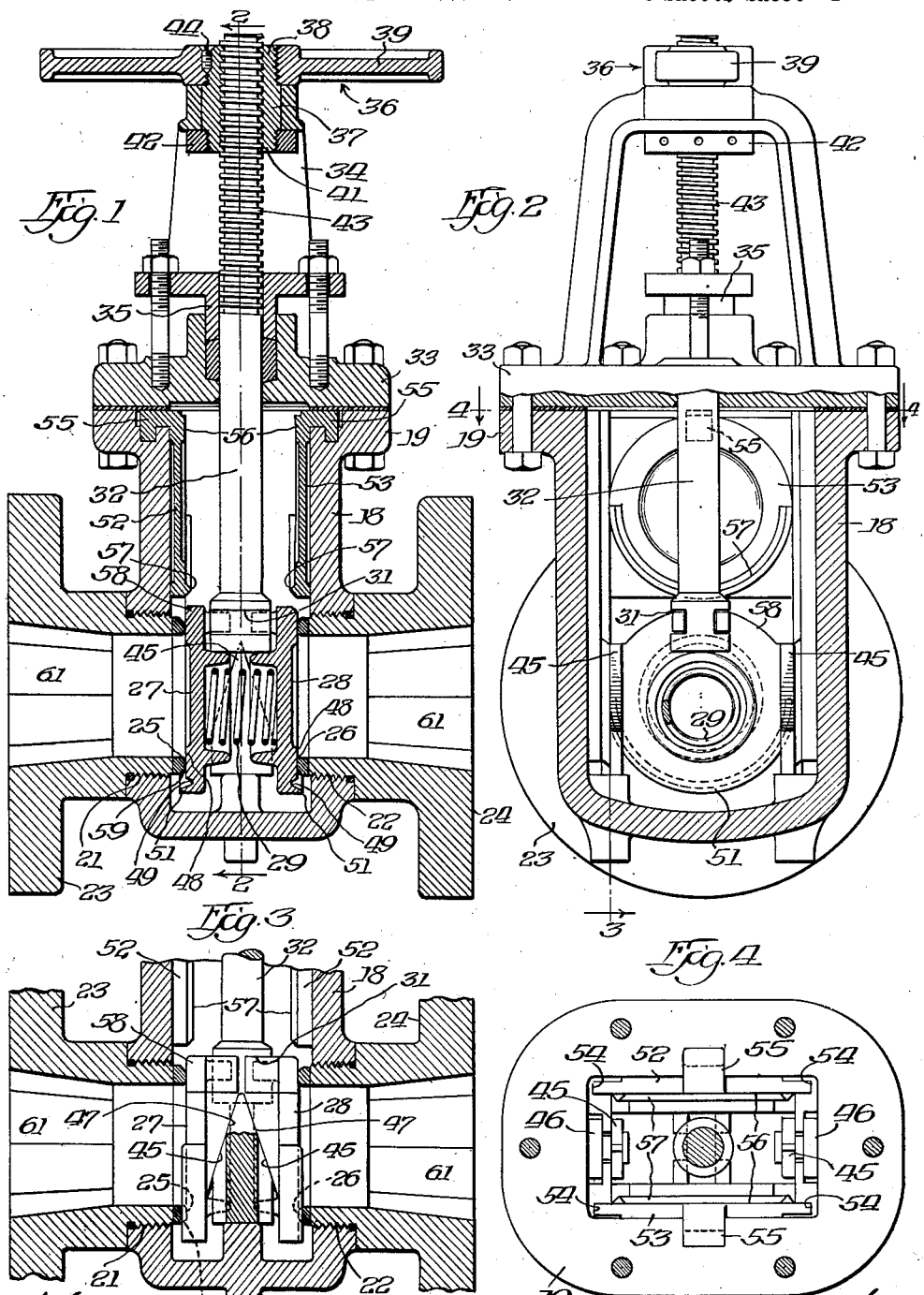

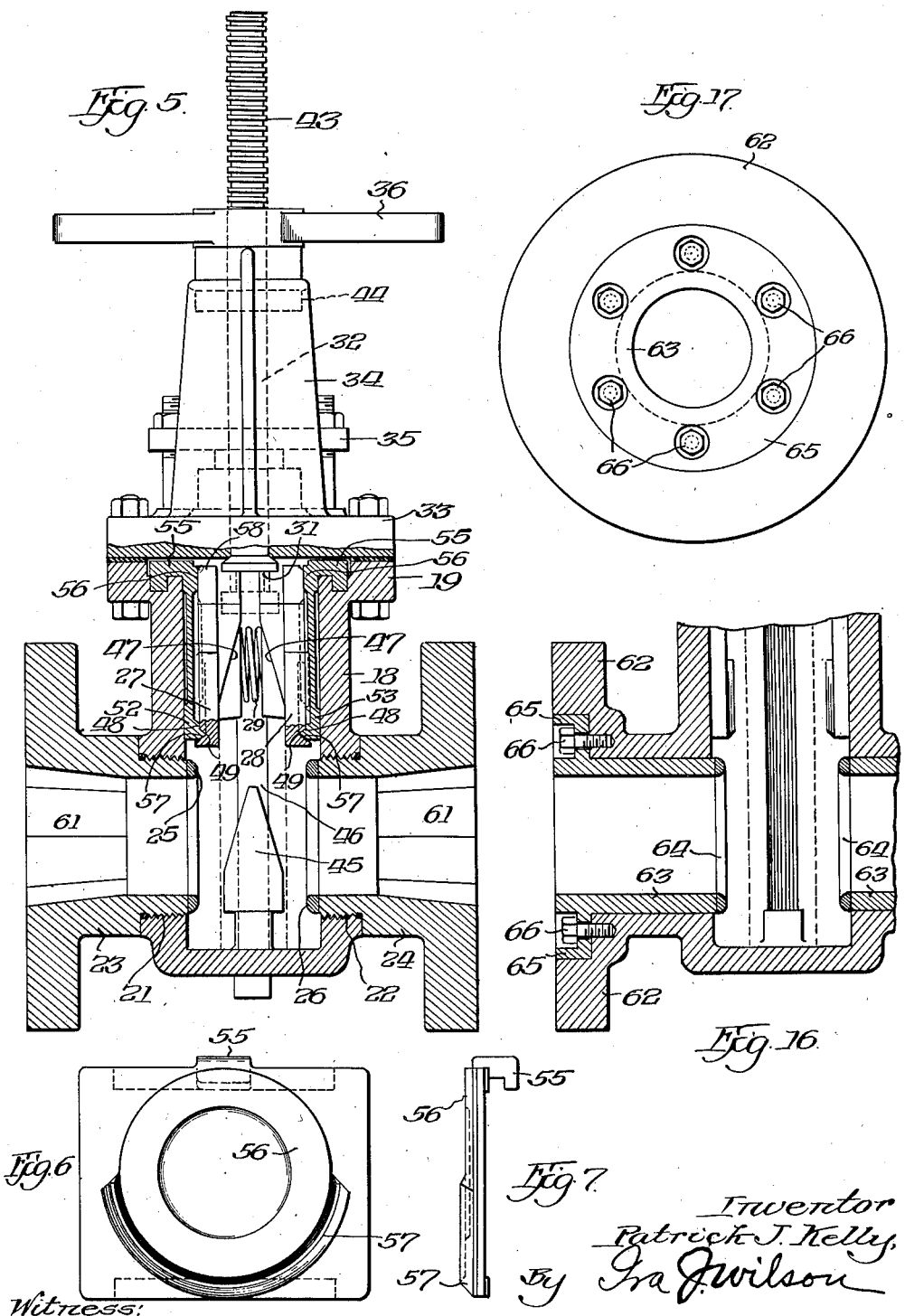

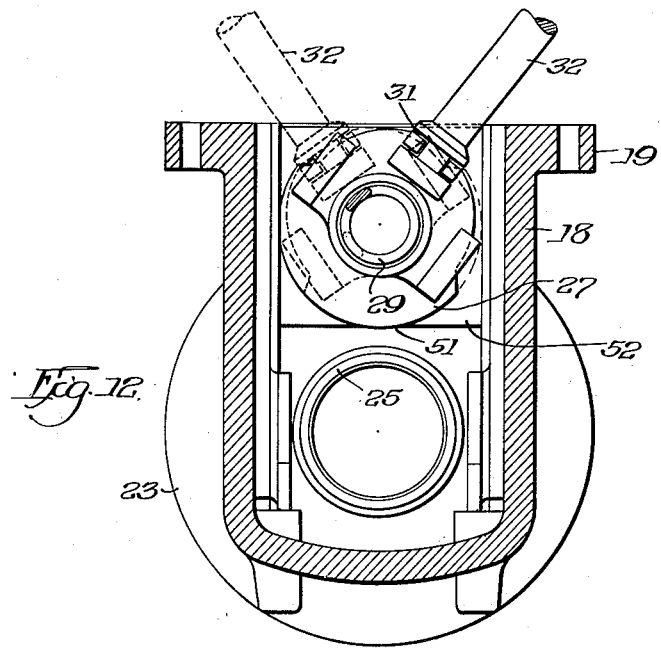
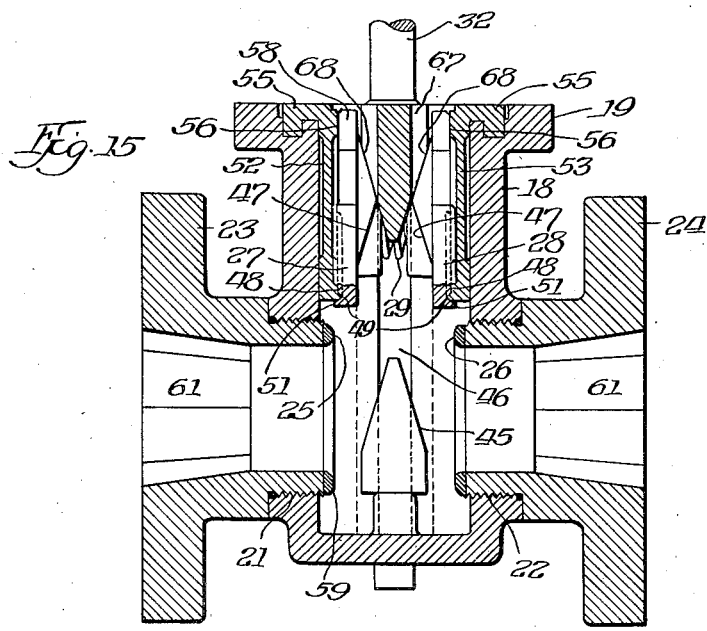

Patented Dec. 15, 1931

1,836,374

UNITED STATES PATENT OFFICE

PATRICK J. KELLY, OF GRAND HAVEN, MICHIGAN, ASSIGNOR, BY DIRECT AND MESNE ASSIGNMENTS, TO KELLY COMPANY, OF CHICAGO, ILLINOIS, A CORPORATION OF ILLINOIS

VALVE

Application filed December 23, 1927. Serial No. 242,056.

This invention relates to valves in general and more particularly to valves of the gate type in which a closure is moved transversely of an opening to open and close the same.

Gate valves are frequently used in lines containing a fluid which has a considerable amount of sediment in suspension and it is accordingly highly desirable that such valves be so constructed that they counteract the tendency of the sediment to deteriorate the cooperating surfaces of the valve closure and seat. Furthermore it is very desirable to have a valve of the gate valve type in which the cooperating surfaces of the valve closure and seat may be conveniently renewed and this if possible without removing the valve body from the line.

It is the primary object of this invention to provide a valve which automatically counteracts the deteriorating tendency of the fluid passing through the valve whereby the cooperating surfaces of the valve closure and seat would, compared with the valves now in use, require very little attention.

It is further an object of this invention to provide a valve having a standard body in which interchangeable inserts may be screwed for connecting the body in the line or for utilizing the body for other purposes.

It is also an object of this invention to provide a valve with interchangeable inserts on which are integrally cast metal alloy rings to form valve seats, these rings coming within the body when the valve is assembled so that they are not subjected to crushing action from the body owing to the difference in expansion between the two metals.

It is also an object of this invention to provide a gate valve in which the cooperating surfaces of the valve closure and seat are automatically subjected to a finishing action when the valve is opened or closed.

It is also an object of this invention to provide a valve of the gate valve type employing a pair or discs adapted to cooperate with a pair of spaced seats and means for positively forcing these discs against their respective seats and withdrawing them from said seats uniformly so as to prevent wire drawing, uneven wear or scoring of the surface.

It is further an object of this invention to provide a valve of the outside screw and yoke type in which the yoke is provided with a bearing for the screw consisting of a removable bushing that can be conveniently taken out and replaced without disturbing the line.

It is also an object of this invention to provide a valve of the above type which is simple to manufacture and operate and the parts of which are conveniently accessible for inspection, renewal or repair.

Other and further objects of this invention will be apparent as the same becomes better understood from an examination of the specification and claims in connection with the accompanying drawings in which:

Fig. 1 is a section through the vertical and longitudinal center lines of a gate valve embodying this invention, Fig. 2 is a section taken at the line 2—2 of Fig. 1 with parts in elevation, Fig. 3 is a fragmentary section taken at the line 3—3 of Fig. 2, Fig. 4 is a section taken at the line 4—4 of Fig. 2, Fig. 5 is a longitudinal view partly in section showing the valve in open position, Fig. 6 is an enlarged elevational view of one of the protecting plates for the valve discs, Fig. 7 is a side view of the plate shown in Fig. 6, Fig. 8 is an enlarged elevational view of one of the discs, Fig. 9 is a similar view of one of the discs, Fig. 10 is a section taken at the line 10—10 of Fig. 8, Fig. 11 is a plan view of one of the discs, Fig. 12 is a sectional view taken through the transverse and vertical center lines of the valve body with the bonnet removed showing the manner in which the discs may be ground without removing them from the body, Fig. 13 is a fragmentary view partly in section of a modification, Fig. 14 is an end view of the same, Fig. 15 is a view taken similarly to that of Fig. 5 illustrating a slightly modified form of a valve embodying this invention, Fig. 16 is a fragmentary sectional view of another modification, and Fig. 17 is an end view of the same.

Referring to the drawings more particularly number 18 represents a casting which is formed open at its upper end and provided with a flange 19 surrounding the opening in said end. The casting 18 forms a standard body for a gate valve and is provided with aligned lateral openings 21 and 22 in its opposite walls respectively. These openings 21 and 22 are preferably screw threaded whereby they may receive interchangeable inserts of screw, flange, hub or spigot types, flange type inserts 23 and 24 respectively being shown secured in said openings. On the inner ends of these inserts alloy metal rings 25 and 26 respectively are cast integral to form the valve seats with ample provision for refacing. When these inserts are in position as shown these rings come well within the body so that they are not subjected to crushing action from the body owing to the difference in expansion between the two metals, and the leakage that would ordinarily result at the juncture therebetween.

The valve closure is in the form of a collapsible member which presents opposite disc surfaces and is normally held in expanded position whereby these surfaces are yieldably held against opposite inner walls of the body. This closure consists of a pair of parallel discs 27 and 28 respectively which are normally held away from each other toward the opposite inner walls of the valve body by a helical spring 29 mounted between said discs. Each disc 27 and 28 at its upper inner side is provided with recesses cooperating with shoulders formed by grooves 31 at the base of a valve stem 32 whereby the valve closure is attached to said stem.

A bonnet 33 is bolted to the upper end of the casting 18 at the flange 19 and is provided with a central integral yoke 34. Beneath the yoke 34 and in the bonnet 33 is a suitable stuffing box 35 the stem 32 rising through said stuffing box and yoke to a T handle 36 at the top of said yoke. The handle 36 includes a bushing 37 which extends through the top of the yoke with an outwardly threaded upper portion 38 to which the T handle 39 is removably secured and a lower outwardly threaded portion 41 to which a threaded member 42 is secured. The bushing 38 is provided with an inwardly threaded portion which cooperates with the threads 43 of the stem 32. This bushing may, by the withdrawal of a small screw 44, be taken out and replaced without disturbing the line.

As the valve closure is moved downwardly by rotating the handle 36 the valve discs 27 and 28 are positively forced, in addition to the action of the spring 29, against their respective seats by central, aligned, tapered wedges 45 which fit loosely into T slots on opposite sides of the valve body. These wedges have vertical stems 46 by means of which they can be readily removed from the body when the bonnet has been detached. The wedges 45 are V-shaped and point upwardly whereby they may cooperate with corresponding sloping surfaces 47 on the inner sides of the valve discs to force said discs against their respective seats when the handle 39 is actuated to move the closure downwardly. The side edges of the stems 46 do not extend to the sides of the respective T slots, the stems 46 being much narrower than the T slots leaving considerable space between the said edges and sides whereby the wedges are in a sense floating and may accommodate for any inequalities as to the distances from center of the respective seats or disc surfaces.

The outer surface of each disc 27 and 28 is provided, in addition to a circular surface 48 which is adapted to cooperate with the valve seat, with a semi-spherical groove 49 concentric with said surface but just outside of the same. The lower or outer wall of the groove 49 rises beyond the surface 48 of the disc to form a cleaning edge 51 that sweeps over the valve seat as the closure moves up and down over said seat.

To guard the discs 27 and 28 when the valve is open protecting plates 52 and 53 respectively are suspended on the upper inner walls of the body. Slots 54 formed on the inner walls of the casting 18 guide said plates and lug hooks 55 in corresponding recesses at the top of said casting hold said plates in place. On the face of each plate is a circular machined surface 56 to correspond with that on the valve disc. Around the lower periphery of the surface 56 is a concentric ridge 57 the function of which is to scrape off any accumulation of sediment on the disc surface 48 as the valve closure rises to the full-open position.

When the valve is opening or closing the projecting ridge 57 and 51 cause the surface 48 of each disc to move uniformly away or toward, as the case may be, the surface of the valve seat, eliminating uneven wear, wire drawing or scoring of the surfaces. This is brought about by a circular bevelled edge 58 on each of the discs and a bevelled edge 59 on each of the seats. Each ridge 57 projects into the interior of the valve body beyond the plane of the corresponding valve seat substantially the same distance that the ridge 51 projects beyond said plane on the other side thereof when the valve is in closed position. The distance between the lowermost periphery of the ridge 57 and the lowermost periphery of the edge 59 is substantially the same as the distance between the uppermost periphery of the edge 58 and the lowermost periphery of the ridge 51 whereby the edge 58 may ride upwardly or downwardly on the outer wall of the ridge 57 while the inner wall of the ridge 51 is riding upwardly or downwardly on the edge 59 to move the surface 58 uniformly relative to the surface of the seat.

At the upper limit of travel of the valve closure each ridge 57 coincides with the corresponding groove 49 of the respective valve disc and seats therein. This permits the spring 29 between the discs to bring the surfaces 48 and 56 into intimate contact so that the former is fully protected against the accumulation of sediment thereon while the valve remains in the wide open position.

The spring 29 is of sufficient strength to hold the discs against their respective protecting plates with the ridges 57 in the corresponding grooves 49 of the discs whereby the disc surfaces may be ground against the plate surfaces by removing the bonnet of the valve and oscillating the valve closure by swinging the valve stem back and forth as shown in Fig. 12.

Since the trade requires that if the flanges on the inserts 23 and 24 are supplied with apertures for bolting them in a line, said apertures be symmetrical with respect to the vertical center line of the valve body it is necessary to locate the position for these apertures after the inserts have been positioned in their respective apertures in the valve body. The inserts may then be removed, the apertures drilled therein, and re-assembled. To facilitate positioning of the inserts in the body they are provided with tapered angular recesses 61 at the outer end of the passage through the inserts whereby a socket wrench may be used. The recesses may be tapered in order that different size wrenches may be used.

As shown in Figs. 13 and 14 a hub or screw type of insert may be used as well as the flange type.

As shown in Figs. 16 and 17 the flanges 62 for connecting the valve body in a line may be cast integral with the body or otherwise secured thereto and a thimble or sleeve 63 may be secured in the flange, a ring 64 of metal alloy being cast integral on the inner end of the thimble to form the valve seat. In this case also the ring is well within the valve body whereby its juncture with the insert, which in this case is the thimble, is not subject to leakage due to the difference in expansion between the metal of the ring and that of the thimble. The thimble 63 may be secured in the flange in any suitable manner but in this case is shown as provided with a flange 65 which is countersunk in the face of the flange 62 and is bolted thereto by countersunk studs 66. For high pressure work faces of flanges are often times provided with male and female tongue and grooves. These features may be incorporated in the outer end of the thimble 63 itself.

As shown in Fig. 15 upper wedges 67 may be provided in addition to the wedges 45. Corresponding cooperating surfaces 68 are provided in this modification on the valve discs and are adapted to cooperate with the wedges 67 as the valve is moved to full open position to positively force the discs against their corresponding protecting plates thus supplementing or to some extent rendering unnecessary the spring 29 for this purpose.

It is believed that the operation and advantages of the aforedescribed valve will be apparent without further description.

I am aware that many changes may be made and many details varied without departing from the principles of this invention and I do not wish to be limited to the details shown or described.

I claim:

1. In a valve, a body formed to provide an inner chamber and a pair of aligned apertures communicating with opposite sides of said chamber, a pair of annular seats surrounding said apertures respectively, a collapsible valve closure presenting opposite disc surfaces for the respective seats and capable of being moved transversely of said seats, means for moving said closure transversely of said seats, and means consisting of detachable wedges for positively expanding the closure to force the disc surfaces against their respective seats, said wedges having extensions thereto extending upwardly along the sides of said body portion to substantially the upper end thereof.

2. In a valve, a body formed to provide an inner chamber, an open end at one end of said chamber and a pair of aligned apertures communicating with opposite sides of said chamber, a pair of seats surrounding said apertures respectively, a valve closure including a pair of opposite disc surfaces for the respective seats, the closure being capable of being moved transversely of said seats into and out of contact therewith, the body provided also with oppositely aligned protecting surfaces one for each disc surface and so positioned with respect to the path of movement of the closure that when the closure has been moved from said seats to a point in proximity to the open end of said chamber they will be opposite the respective disc surfaces, means for holding the disc surfaces against their respective protecting surfaces when the closure is opposite the same, a cover for the open end of said body detachable to permit access to said closure and means associated with said protecting surfaces for centering said disc surfaces with respect thereto and permitting the rotation on said protecting surfaces of the disc surfaces, said protecting surfaces being free from any projecting portions above the longitudinal center thereof.

In witness of the foregoing I affix my signature.

PATRICK J. KELLY.